April 5, 1927.
J. KARITZKY
1,623,792
CABLE CLAMP AND BRIDLE RING
Filed Oct. 1, 1924
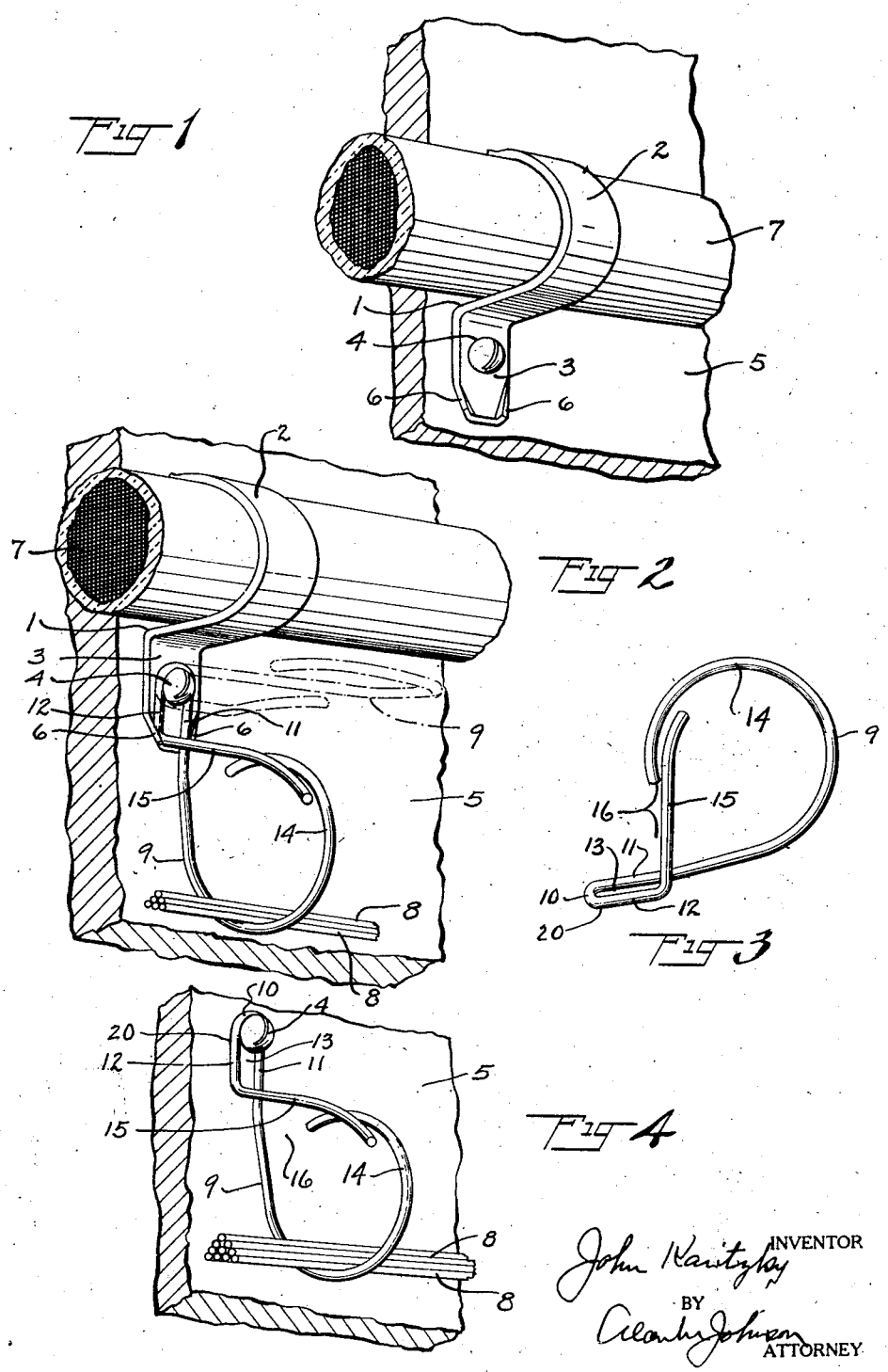

Patented Apr. 5, 1927.

1,623,792

UNITED STATES PATENT OFFICE.

JOHN KARITZKY, OF GARWOOD, NEW JERSEY, ASSIGNOR TO HENRY B. NEWHALL, OF PLAINFIELD, NEW JERSEY.

CABLE CLAMP AND BRIDLE RING.

Application filed October 1, 1924. Serial No. 740,963.

My invention relates to a new conduit or cable clamp, which may be used alone, or with my new bridle ring. My invention also relates to a new bridle ring which may be used in combination with the conduit or cable clamp, or separately, if desired.

My invention further relates to certain articles of manufacture, combinations, and sub-combinations as more fully hereinafter described and pointed out in the claims.

The invention illustrated, described and claimed in this application is for a species of the genus covered by the broad generic Patent No. 1,365,060 patented Jan. 11, 1921 to myself and Henry W. Pleister as joint inventors.

In the figures in which I have shown one embodiment of my invention, the same reference numerals refer to similar parts in the several figures.

Fig. 1 is a perspective view of my conduit or cable clamp supporting a cable to a wall or other suitable support;

Fig. 2 is a perspective view, similar to Fig. 1, showing in dotted lines the manner of attaching my improved bridle ring to the conduit or cable clamp; and, in full lines, the permanent attached positioning of the bridle ring.

Fig. 3 is a perspective view of my improved bridle ring;

Fig. 4 is a perspective view of my improved bridle ring shown supporting runs of bridle wires or drop wires on a wall or other suitable support.

In the form of my invention, illustrated in the drawings, 1 is a conduit or cable clamp having a hook portion 2 and a heel or base portion 3 which is provided with a hole (not shown) for the passage of the screw 4, or other securing member which holds the conduit or cable clamp to the wall or other suitable support 5. The heel or base portion 3 of the conduit or cable clamp is provided with one or more substantially longitudinally extending ears 6, 6 preferably formed by bending up the heel or base portion, as shown in the drawings. My conduit or cable clamp is preferably formed out of sheet metal so that the ears 6, 6 may be bent up at the same time that the conduit or cable clamp is formed.

Ordinarily, the conduit or cable clamp 1 secures the cable 7 to the wall or other suitable support, the cable having sufficient capacity to carry all the present and reasonable future traffic load that may be thrown upon it. Frequently, however, it is impossible to predict exactly what the future load may be on any given cable, so that the cable, in time, becomes overloaded and cannot take care of the traffic, and yet the overload is not sufficient to warrant the expense of taking down the cable and substituting a new one of greater capacity. Moreover, in some cases, the overload may be simply temporary. In such cases, the capacity of the cable, or of the installation, is supplemented by stringing runs of bridle wires 8, 8 parallel to the cable to take this overload.

In my invention, this can be readily done by simply unscrewing the securing screw 4 and attaching my improved bridle ring 9.

This bridle ring 9 is formed out of wire bent back upon itself at 10 to form the two arms 11 and 12 which together form the open shank 20, the opening between the arms being designated 13. The arm 11 is then bent back upon itself to form the open hook 14. The continuation of the other arm 12 is bent substantially at right angles to the shank 20 to form a guard 15 which closes the opening 16 of the hook 14.

This bridle ring may be quickly attached to the conduit or cable clamp 1 by simply loosening the screw 4, but not withdrawing it, to permit the bridle ring 9 with its shank 20 formed by the arms 11 and 12 to be brought at right angles to the conduit or cable clamp, which will permit the stem of the screw 4 passing into the opening 13 between the arms 11 and 12, the head of the screw 4 being above the shank 20. The bridle ring 9 is then sharply drawn to the right, while still held at right angles to the longitudinal axis of the conduit or cable clamp, until the screw engages with the bent portion 10, as shown in dotted lines in Fig. 2. It is then swung down 90° until it is directly beneath the hook 2, and in line with the longitudinal axis of the conduit or cable clamp, the arms 11 and 12 then cooperating with the ears 6, 6, one of the ears 6, lying under the arm 12, and assisting in supporting it, as well as preventing, with the other ear 6, any swinging of the bridle ring 9 on the screw 4. When the parts are in this position, it is simply necessary to again screw up the screw 4, which will securely hold the bridle ring 9 to the conduit or cable clamp. The bridle ring is supported by the screw 4, and held immovably in its correct vertical position by the cooperating ears 6, 6, which prevent any relative movement between the bridle ring and the conduit or cable clamp.

In this position of the parts, the runs of bridle wires can be threaded through the bridle ring and they will be held therein by the guard 15, which closes the opening 16 against accidental disengagement due to swaying of the wires from wind or from other causes.

Should it be desirable at any future time, due to decreased traffic load, to remove the runs of bridle wires 8, 8 and the bridle rings 9, this can be readily done by simply loosening, but not removing, the screw 4 and reversing the operation above described. The bridle rings and bridle wires can then be used over again in other locations.

My bridle ring may be also used alone to support drop wires or bridle wires as shown for example in Fig. 4.

Having thus described this invention in connection with an illustrative embodiment thereof, to the details of which I do not desire to be limited, what is claimed as new and what is desired to secure by Letters Patent is set forth in the appended claims.

What I claim is:—

1. A new article of manufacture comprising an integral conduit or cable clamp having a hook portion adapted to support a cable and a heel or base, said heel or base being provided with an opening for a securing member and with two substantially vertically extending ears located at the end of the heel or base removed from the hook portion, one ear adapted to assist in supporting a bridle ring by a portion of the bridle ring resting upon it, and both ears preventing accidental swinging or swaying of a bridle ring on the cable clamp.

2. The combination of a conduit or cable clamp having a hook and a heel or base portion provided with an opening for a securing member and with two spaced ears located at the end of the heel or base removed from the hook and extending substantially vertically, one of the ears adapted to assist in supporting a vertically mounted bridle ring, and a wire bridle ring having two spaced arms forming an open shank to fit beneath a securing member, the shank extending towards and in line with the hook, one of the arms being bent to form a shoulder to rest on one of the ears to assist in transmitting the strains from the bridle ring to the cable clamp, both ears preventing accidental swinging or swaying of the bridle ring on the cable clamp, and a securing member to cooperate with the cable clamp and bridle ring.

JOHN KARITZKY.